United States Patent Office 3,540,937
Patented Nov. 17, 1970

3,540,937
THERMAL BATTERY WITH THALLIUM SESQUIOXIDE DEPOLARIZER
Hiroshi Kumano, Daito-shi, Yoshimi Omukai, Hirakata-shi, and Hiroshi Yamasaki, Neyagawa-shi, Japan, assignors to Matsushita Electric Industrial Co., Ltd., Osaka, Japan, a corporation of Japan
Filed Feb. 27, 1969, Ser. No. 802,994
Int. Cl. H01m 15/06
U.S. Cl. 136—137                           4 Claims

ABSTRACT OF THE DISCLOSURE

A thermal battery having a large discharge capacity, in which thallium sesquioxide is used as depolarizer.

BACKGROUND OF THE INVENTION

Field of the invention

The present invention relates to improvements in thermal batteries.

Description of the prior art

A thermal battery is a battery which remains inactive at normal temperature without supplying a practical output to the outside but is rendered active when heated to a high temperatures, supplying electrical power to the outside. Thermal batteries using such an electrolyte which is electrically insulating solid at normal temperature but becomes an ion conductive liquid at elevated temperatures, have already been put to practical use. Most of these thermal batteries are provided with a heating source for heating the unit cells to an operating temperature and an ignition unit for actuating said heating source, in using the batteries, said heating source consisting of a mixture of a metal and an oxidizing agent. The thermal batteries of the type described above have the following advantages and, therefore, are being used as power source for emergency use, as power source for missiles, etc.

(1) The shelf life is long and the output is not substantially decreased even after storage for 5 years or longer.

(2) The battery can be used in an ambient temperature range from —54° to +71° C. or even in a wider range.

(3) The battery has strong resistance to vibration, shock and acceleration.

(4) The battery does not require inspection or maintenance during storage, namely the battery is maintenance-free.

(5) A power can be obtained quickly upon operation of the battery: namely time lag is 1 second or less.

In the past, a variety of battery structures have been developed for thermal batteries. The most typical one of these structures is a system in which magnesium is used as negative electrode and tungsten trioxide and lead chloride and potassium chloride as electrolyte and calcium chromate as depolarizer. Besides, systems are available in which metallic calcium, metallic lithium, etc. are used as negative chloride and tungsten trioxide and lead chromate as a depolarizer. However, none of these systems are entirely satisfactory in respect to production technique, output characteristic, convenience in use, safety and cost.

Where the conventional depolarizers as mentioned above are used, a potential drop occurs and the output characteristic is impaired due to polarization during quick discharging, namely discharging of a high current per unit cell, because while it may not be definitely said that the electric resistance of said depolarizer immediately becomes an internal resistance of the battery, on consideration of the diffusibility of the depolarizer in the depolarizer layer, the diffusibility of the depolarizer is apparently interior to the electron conducting property in respect of velocity.

SUMMARY OF THE INVENTION

The object of the present invention is to provide a thermal battery comprising a negative electrode, an electrolyte, a depolarizer and a positive electrode collector, said electrolyte being normally solid and electrically non-conductive but fused to be ion-conductive when heated, characterized in that said depolarizer consists primarily of thallium sesquioxide.

Namely, the characteristic feature of the present invention resides in the use of thallium sesquioxide as depolarizer in thermal batteries of the type specified above. The difference between the thallium sesquioxide used in the present invention, and potassium chromate, lead chromate and tungsten trioxide which have been used hitherto, exists in the fact that the former has particularly good electron conducting property. For instance, while the electric resistance of a 1 mm. thick depolarizer layer molded of 100% thallium sesquioxide is 100 m$\Omega$/cm.$^2$ or less, that of a depolarizer layer consisting of potassium chromate is 100 m$\Omega$/cm.$^2$ or greater which is billion times or more as great as the former. The electric resistance of a depolarizer layer consisting of lead chromate or tungsten trioxide is more or less the same as that of potassium chromate layer.

DESCRIPTION OF THE PREFERRED EMBODIMENT

Now, the present invention will be illustrated hereunder by way of example with reference to the accompanying drawings.

Figure 1:
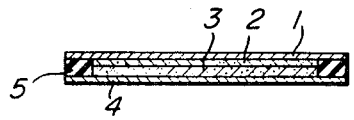
FIG. 1 is a vertical cross-section view of a unit cell embodying the present invention.

Referring to FIG. 1, reference numeral 1 designates a negative electrode consisting of magnesium, 2 an electrolyte consisting of an eutectic mixture of lithium chloride and potassium chloride, 3 a depolarizer layer consisting of thallium sesquioxide, 4 a positive electrode collector consisting of nickel and 5 an insulating spacer.

Figure 2:
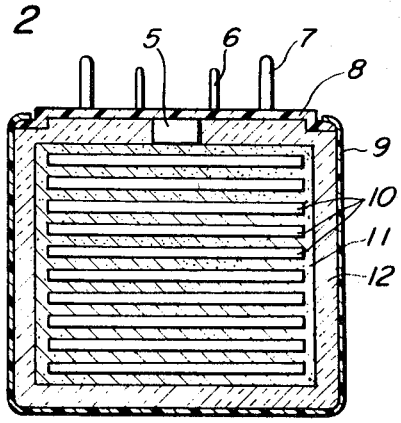
FIG. 2 is a vertical cross-sectional view of a thermal battery using the unit cell shown in FIG. 1.

Using the unit cell described above, a battery A was produced having a structure as shown in FIG. 2. Separately a battery B was produced using a unit cell which had been produced in the same manner as the unit cell shown in FIG. 1 but using calcium chromate as depolarizer. The discharge characteristics of these batteries A and B at 500° C. were compared, with the result shown in FIG. 3. Namely, with reference to FIG. 3 the curves $a$ and $b$ represent the characteristics of the batteries A and B respectively when said batteries were discharged at a current density of 100 ma./cm.$^2$, and $a'$ and $b'$ represent the characteristics when said batteries were discharged at a current density of 350 ma./cm.$^2$ respectively.

As is apparent from the diagram, the battery according to the present invention is superior to the conventional one in discharge performance, and such superiority is particularly remarkable in a discharge of the battery at high current densities. This substantiates the fact that thallium sesquioxide has excellent electron conducting property as mentioned previously and also that said property is preferable for the depolarizer of a thermal battery. In addition, thallium sesquioxide has excellent moldability and other properties which facilitate the formation of a depolarizer layer, and enables the advantageous features of thermal batteries, stated previously, to be sufficiently exhibited. The fact that thallium sesquioxide shows excellent performance in a wide range of discharge rate is particularly advantageous for miniaturization of batteries, and makes it possible to obtain a small-sized, large output thermal battery.

It is to be understood that while in the example illustrated above use is made of thallium sesquioxide only, the thallium sesquioxide may be used in mixture with other depolarizers.

It is also to be understood that when thallium sesquioxide is used, as depolarizer, in mixture with a salt of metal and oxyacid, e.g. potassium perchlorate, a better performance can be obtained than when thallium sesquioxide is used singly. In this case, potassium perchlorate is added preferably in an amount of 30% or less of thallium sesquioxide.

Figure 3:
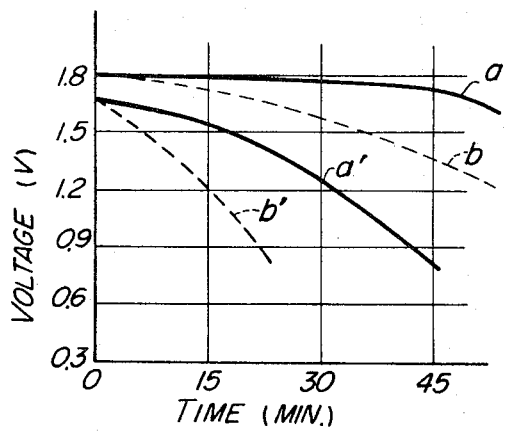
FIG. 3 is a diagram graphically showing the discharge performance of the thermal battery in comparison with that of a conventional one.

In FIG. 3, there is shown, in cross-section, a thermal battery of the type having a heating source disposed therein. Referring to FIG. 3, reference numeral 5 designates an ignition element comprising a heater adapted to be incandesced by external electrical power, a priming composition and a casing and 6 designates an outer terminal of said ignition element. Reference numeral 7 designates an output terminal of the battery, 8 and 9 an outer casing and 10 unit cells. The unit cells 10 each have the structure as shown in FIG. 1 and are connected with each other either in series or in parallel and with the output terminal 7. A heating source 11 consists of a metal powder and an oxidizing agent, and is capable of heating the unit cells 10 to the operating temperature when ignited by the ignition element 6. Reference numeral 12 designates a heat insulating material by which the operating temperature of the unit cells is maintained for a necessary period of time and which also serves to prevent the outer surface of the battery from becoming excessively hot causing thermal damage to external objects.

Such a thermal battery having a heating source disposed therein has the advantage that it can be used without requiring a separate heat source, and is, therefore, of the type which is preferred from a practical standpoint.

We claim:

1. A thermal battery comprising a negative electrode, an electrolyte, a depolarizer and a positive electrode collector, said electrolyte being normally electrically non-conductive solid but fused to be ion-conductive at an elevated temperature, characterized in that said depolarizer consists primarily of thallium sesquioxide.

2. A thermal battery according to claim 1, in which said depolarizer consists of a mixture of which a major part is thallium sesquioxide and which contains potassium perchlorate.

3. A thermal battery according to claim 1, in which is disposed a heat source for operating the battery.

4. A thermal battery according to claim 2, in which is disposed a heat source for operating the battery.

References Cited

UNITED STATES PATENTS

| 2,631,180 | 3/1953 | Robinson | 136—83 |
| 3,079,454 | 2/1963 | McGinnis | 136—137 XR |
| 3,160,531 | 12/1964 | Spindler | 136—83 XR |
| 3,189,485 | 6/1965 | Panzer | 136—83 XR |
| 3,367,800 | 2/1968 | Panzer | 136—83 |
| 3,462,312 | 8/1969 | Rightmire et al. | 136—83 XR |

DONALD L. WALTON, Primary Examiner